(12) United States Patent
Chan et al.

(10) Patent No.: US 10,919,603 B2
(45) Date of Patent: Feb. 16, 2021

(54) BOTTOM BRACKET FOR BICYCLES

(71) Applicants: Nathan Chan, West Vancouver (CA); Jasan Patrick Doherty, North Vancouver (CA)

(72) Inventors: Nathan Chan, West Vancouver (CA); Jasan Patrick Doherty, North Vancouver (CA)

(73) Assignees: Nathan Chan, West Vancouver (CA); Jasan Patrick Doherty, North Vancouver (CA)

( * ) Notice: Subject to any disclaimer, the term of this patent is extended or adjusted under 35 U.S.C. 154(b) by 0 days.

(21) Appl. No.: 16/738,536

(22) Filed: Jan. 9, 2020

(65) Prior Publication Data
US 2020/0216142 A1  Jul. 9, 2020

Related U.S. Application Data

(60) Provisional application No. 62/790,432, filed on Jan. 9, 2019.

(51) Int. Cl.
*B62M 3/00* (2006.01)
*B62K 19/34* (2006.01)
*B62M 1/36* (2013.01)
*B62M 9/00* (2006.01)

(52) U.S. Cl.
CPC ............... *B62M 9/00* (2013.01); *B62M 3/00* (2013.01); *B62M 3/003* (2013.01)

(58) Field of Classification Search
CPC .......... B62M 3/003; B62M 3/00; B62M 5/00; B62M 1/36; B62K 19/34; B62H 5/10
See application file for complete search history.

(56) References Cited

U.S. PATENT DOCUMENTS

2011/0108373 A1* 5/2011 Toal ...................... B62K 23/02
188/31

FOREIGN PATENT DOCUMENTS

KR     20050011670 A  *  1/2005  ............. F16H 3/005

* cited by examiner

*Primary Examiner* — Luis A Gonzalez
(74) *Attorney, Agent, or Firm* — Smiths IP; Lawrence Chan

(57) ABSTRACT

A bottom bracket is connected to a spindle and a frame of a bicycle. The bottom bracket comprises a housing and an adapter. The housing is connected to the frame and comprises a substantially circular disc, one or more pins, and an actuating mechanism. The disc comprises a plurality of disc openings arranged proximate to a circumferential edge of the disc and is adapted to rotate with the spindle. The pins selectively engage with the disc openings, wherein the engagement of the pins with the disc openings prevents further rotation of the disc. The actuating mechanism selectively engages the pins with the disc openings. The adapter removably is attached to the housing and connected to the frame.

15 Claims, 8 Drawing Sheets

BOTTOM BRACKET FOR BICYCLES

CROSS-REFERENCE TO RELATED APPLICATIONS

This application claims the benefit of U.S. Provisional Patent Application No. 62/790,432 filed Jan. 9, 2019.

FIELD OF THE INVENTION

The invention relates to bicycles, and in particular, to bottom brackets of bicycles.

BACKGROUND OF THE INVENTION

The bottom bracket of a bicycle connects the crankset to the frame. The bottom bracket allows the crankset to rotate freely with respect to the frame when the pedals are turned. In one conventional bottom bracket, an inner spindle (to which the crankset is attached) extends through the bottom bracket, and ball bearings allow the spindle to rotate within an outer tube (which is attached to the frame).

However, with conventional bottom brackets, because of the arrangement of the ball bearings and the spindle, the crankset is able to freely rotate when, for example, the wheels of the bicycle are no longer in contact with the ground. This may not necessarily be desirable for a rider when executing a jump with the bicycle because the free rotation of the pedals may result in a loss of control or balance for the rider when he or she is in mid-air.

There is therefore a need for a bottom bracket that allows the rider to lock the pedals of the bicycle when desired.

SUMMARY OF THE INVENTION

In accordance with one embodiment of the invention, a bottom bracket comprises a housing and an adapter removably attachable to each other. The housing comprises a housing cavity, and the adapter comprises an adapter cavity. The housing cavity and the adapter cavity are generally coaxial and accommodate a spindle. One or more bearing cages allow for rotation of the spindle within the housing cavity and the adapter cavity.

The housing further comprises a compartment for holding a disc. The disc engages with the spindle and is able to rotate with the spindle. The disc comprises a number of disc openings distributed evenly proximate to a circumferential edge of the disc. The housing further comprises a lock assembly that holds one or more pins. The pins are adapted to engage with the disc openings and when so engaged, prevents the disc (and thereby the spindle) from any further rotation within the compartment.

Engagement of the pins with the disc openings is through one or more springs. When in the "unlocked" state, the springs are compressed and the pins are clear of the disc openings. When the locking system is actuated, such as by pulling of a cable, the springs are decompressed and the pins are moved against the disc. As the disc is rotating, the pins will catch into the disc openings, thereby preventing any further rotation of the disc.

In order to accommodate differing lengths and sizes of spindles, the size of the adapter may differ, while the housing remains uniform. For example, adapters of different sizes may be used with the housing in order to accommodate different bicycles.

In accordance with one embodiment, a bottom bracket is connected to a spindle and a frame of a bicycle. The bottom bracket comprises a housing and an adapter. The housing is connected to the frame and comprises a substantially circular disc, one or more pins, and an actuating mechanism. The disc comprises a plurality of disc openings arranged proximate to a circumferential edge of the disc and is adapted to rotate with the spindle. The pins selectively engage with the disc openings, wherein the engagement of the pins with the disc openings prevents further rotation of the disc. The actuating mechanism selectively engages the pins with the disc openings. The adapter removably is attached to the housing and connected to the frame.

In another embodiment, the actuating mechanism comprises one or more springs attached to the one or more pins.

In still another embodiment, the actuating mechanism further comprises a cable connected to the one or more springs.

In a further embodiment, the cable effects either a compression or a decompression of the one or more springs. A compression of the one or more springs effects a disengagement of the pins with the disc openings. A decompression of the one or more springs effects an engagement of the pins with the disc openings.

In still a further embodiment, the adapter is removably attached to the housing through threaded engagement between the adapter and the housing.

In yet another embodiment, the disc comprises a central opening adapted to engage with the spindle.

In still yet another embodiment, the central opening is defined by a plurality of indents for engaging with the spindle.

In still a further embodiment, the housing comprises a housing cavity extending through the housing, and the adapter comprises an adapter cavity extending through the adapter. The housing cavity and the adapter cavity are substantially coaxial. The housing cavity and the adapter cavity are adapted to allow the spindle to extend therethrough.

In another embodiment, the bottom bracket further comprises one or more bearing cages located within one or both of the housing cavity and the adapter cavity to allow for rotation of the spindle within the housing cavity and the adapter cavity.

In still another embodiment, the one or more bearing cages comprise two bearing cages. The two bearing cages are located proximate to opposing ends of the bottom bracket.

In a further embodiment, the plurality of disc openings is fifteen disc openings.

In still a further embodiment, the one or more pins is three pins.

In yet another embodiment, the housing comprises a compartment and a lock assembly.

The disc is located within the compartment, and the selective engagement of the one or more pins with the disc openings is through movement of the one or more pins within the compartment and the lock assembly.

In still yet another embodiment, the bottom bracket further comprises a pin bar for connecting together the one or more pins.

In another embodiment, the bottom bracket further comprises a rotation coupler and a bracket. The rotation coupler is attached to the lock assembly, while the bracket attached to the rotation coupler and to the frame.

In still another embodiment, the bracket comprises a bracket opening for the spindle to pass therethrough.

In a further embodiment, the bracket is a chain guide bracket.

In yet another embodiment, the housing and the adapter are rigidly attached to the frame.

The foregoing was intended as a summary only and of only some of the aspects of the invention. It was not intended to define the limits or requirements of the invention. Other aspects of the invention will be appreciated by reference to the detailed description of the embodiments.

BRIEF DESCRIPTION OF THE DRAWINGS

The preferred embodiment of the invention will be described by reference to the drawings thereof, in which.

DETAILED DESCRIPTION OF THE INVENTION

Figure 1:
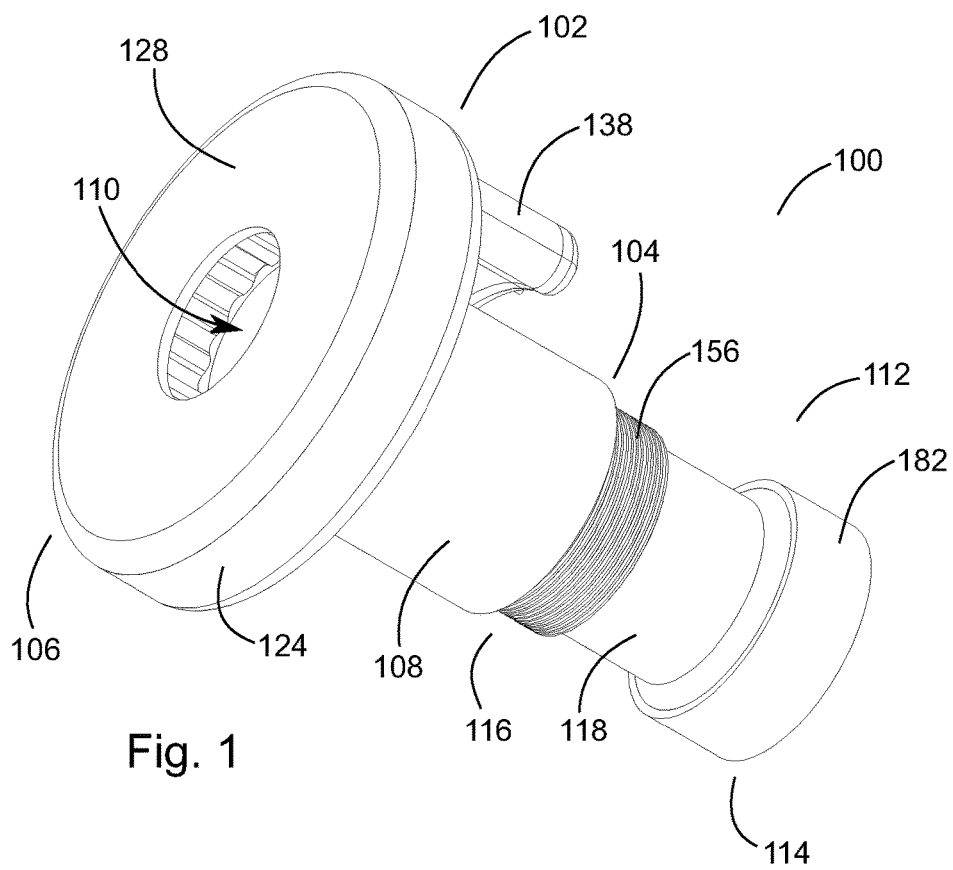
FIG. 1 is a front perspective view of a bottom bracket (upside down for clarity) in accordance with the invention.
Figure 2:
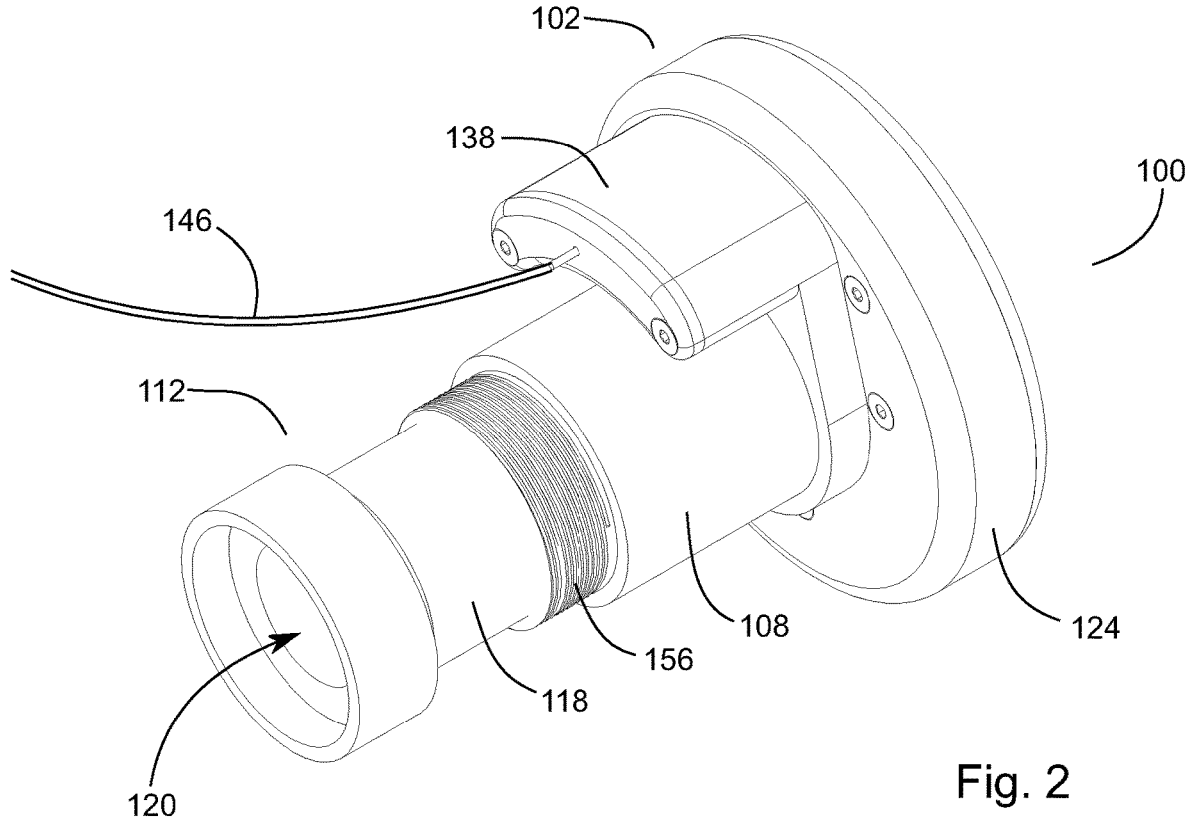
FIG. 2 is a rear perspective view of the bottom bracket (upside down for clarity) of FIG. 1.
Figure 3:
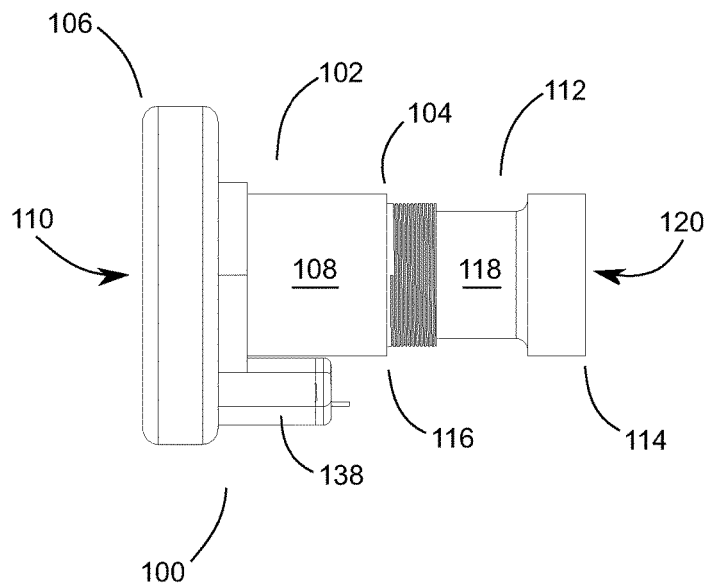
FIG. 3 is a side view of the bottom bracket of FIG. 1.
Figure 4:
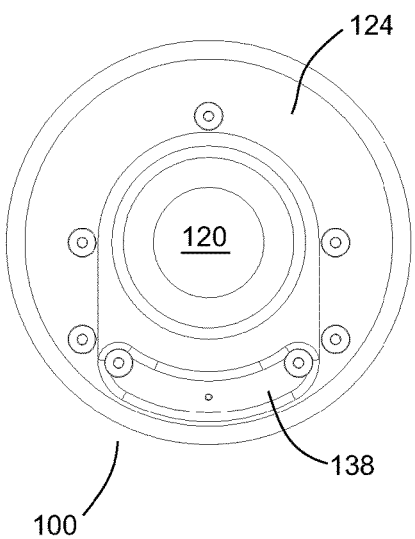
FIG. 4 is a rear view of the bottom bracket of FIG. 1.

Referring to FIGS. 1 to 4, a bottom bracket 100 comprises a housing 102 and an adapter 112 removably attachable to the housing 102. The housing 102 comprises a housing first end 104 and a housing second end 106. The housing 102 further comprises a housing tubular portion 108 extending between the housing first end 104 and the housing second end 106. The housing tubular portion 108 generally defines a housing cavity 110 that extends through the housing 102. The housing cavity 110 is preferably substantially cylindrical in shape and is adapted to accommodate a spindle 10, which is in turn attached to a crankset 12 of the bicycle.

The adapter 112 comprises an adapter first end 114 and an adapter second end 116. The adapter 112 further comprises an adapter tubular portion 118 extending between the adapter first end 114 and the adapter second end 116. The adapter tubular portion 118 generally defines an adapter cavity 120 that extends through the adapter 112. The adapter cavity 120 is preferably substantially cylindrical in shape and is also adapted to accommodate the spindle 10.

Preferably, the adapter 112 is removably attached to the housing 102 by the engagement of the adapter second end 116 with the housing first end 104. For example, the housing tubular portion 110 may comprise a housing threaded section 154 proximate to the housing first end 104 that threadedly engages with an adapter threaded section 156 on the adapter tubular portion 118 proximate to the adapter second end 116. In the embodiment shown in FIGS. 1 to 4, the housing threaded section 154 is formed on the interior of the housing tubular portion 110, while the adapter threaded section 156 is formed on the exterior of the adapter tubular portion 118. However, the reverse arrangement is also possible, with the housing threaded section 154 being formed on the exterior of the housing tubular portion 110 and the adapter threaded section 156 being formed on the exterior of the adapter tubular portion 118 (as shown in the embodiment shown in FIGS. 8 and 9).

Figure 5:
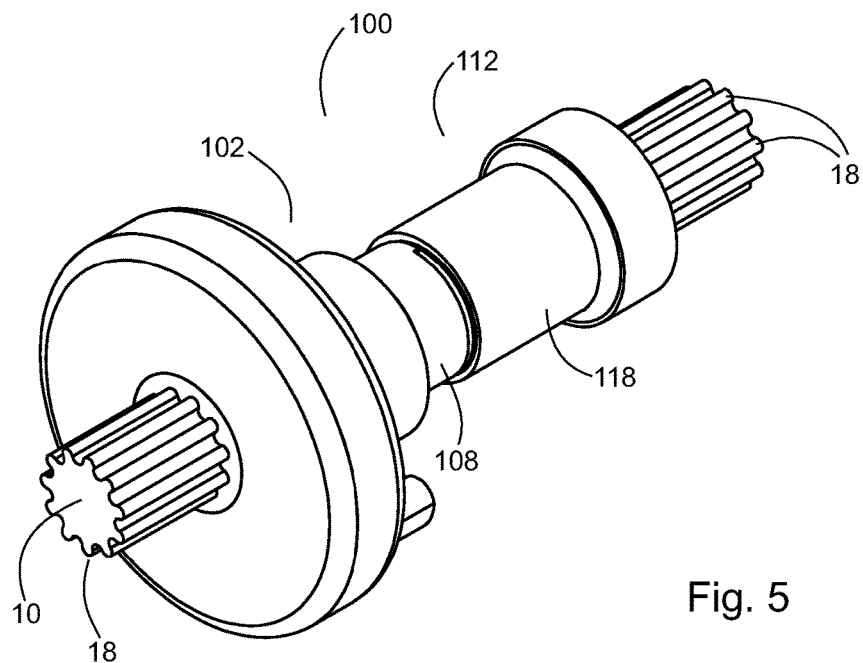
FIG. 5 is a front perspective view of a bottom bracket with the spindle inserted.

The housing cavity 110 and the adapter cavity 120 are substantially coaxial with each other, such that the spindle 10 is able to extend through both the housing cavity 110 and the adapter cavity 120, as shown in FIG. 5.

Figure 6:
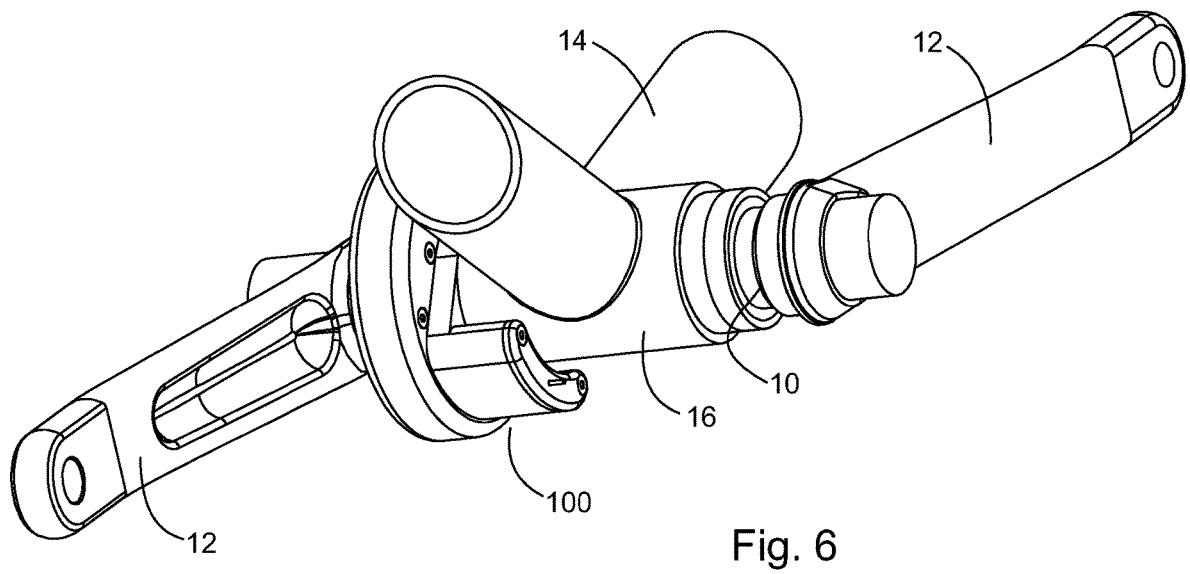
FIG. 6 is a partial perspective view of a bicycle frame with the bottom bracket in accordance with the invention.
Figure 7:
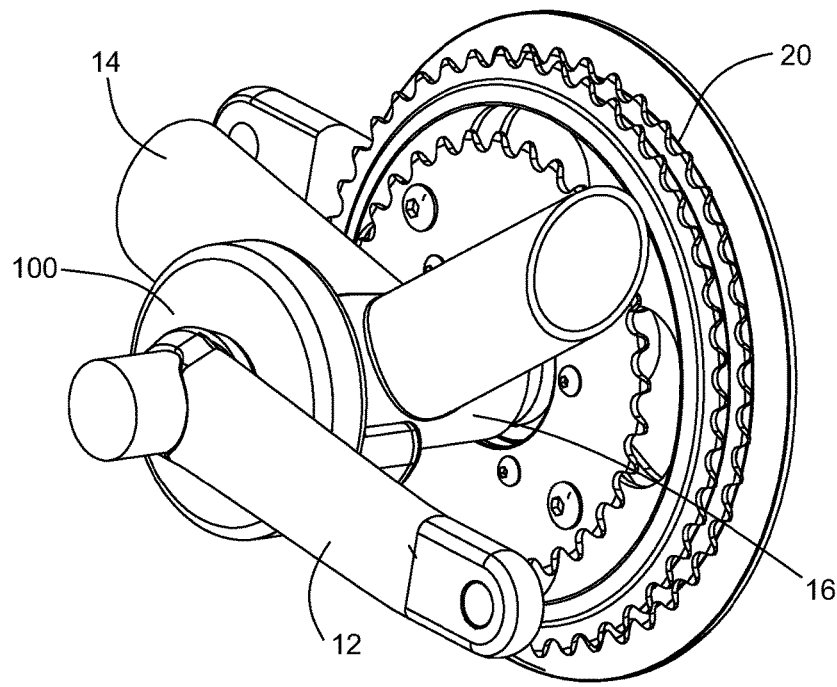
FIG. 7 is a partial perspective view of a bicycle frame (including gears) with the bottom bracket in accordance with the invention.

Referring to FIGS. 6 and 7, which show partial views of a bicycle, the bottom bracket 100 is adapted to fit into a bottom bracket shell 16 located on a frame 14 of the bicycle. The bottom bracket 100 is fixedly engaged to the bottom bracket shell 16, while allowing the spindle 10 (and the crankset 12) to rotate freely with respect to the frame 14. FIG. 6 shows the bottom bracket 100 fitted into the bottom bracket shell 16. FIG. 7 also shows the bottom bracket 100 fitted into the bottom bracket shell 16 but with gears 20 depicted as well.

Figure 8:
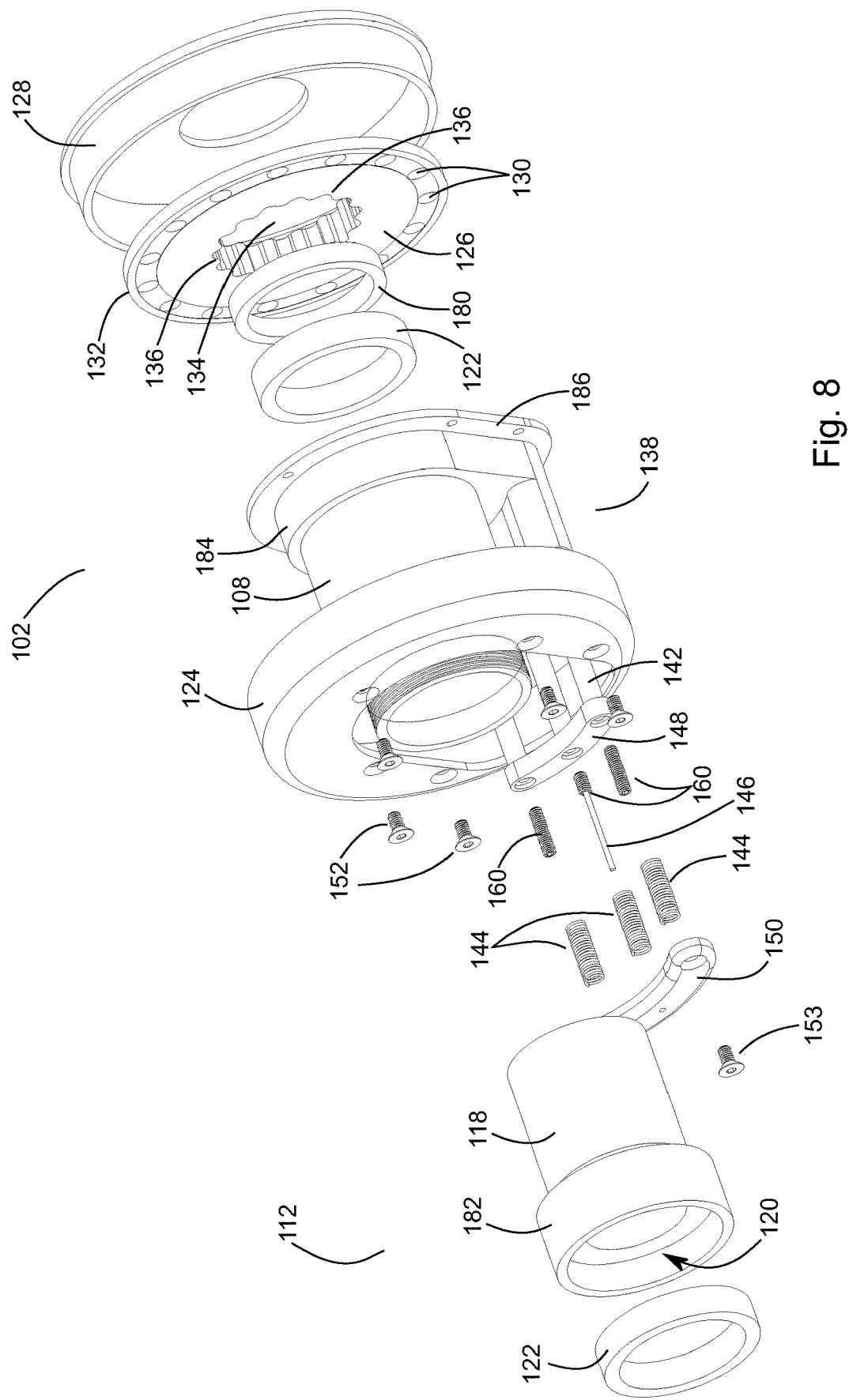
FIG. 8 an exploded view of a bottom bracket in accordance with the invention.
Figure 9:
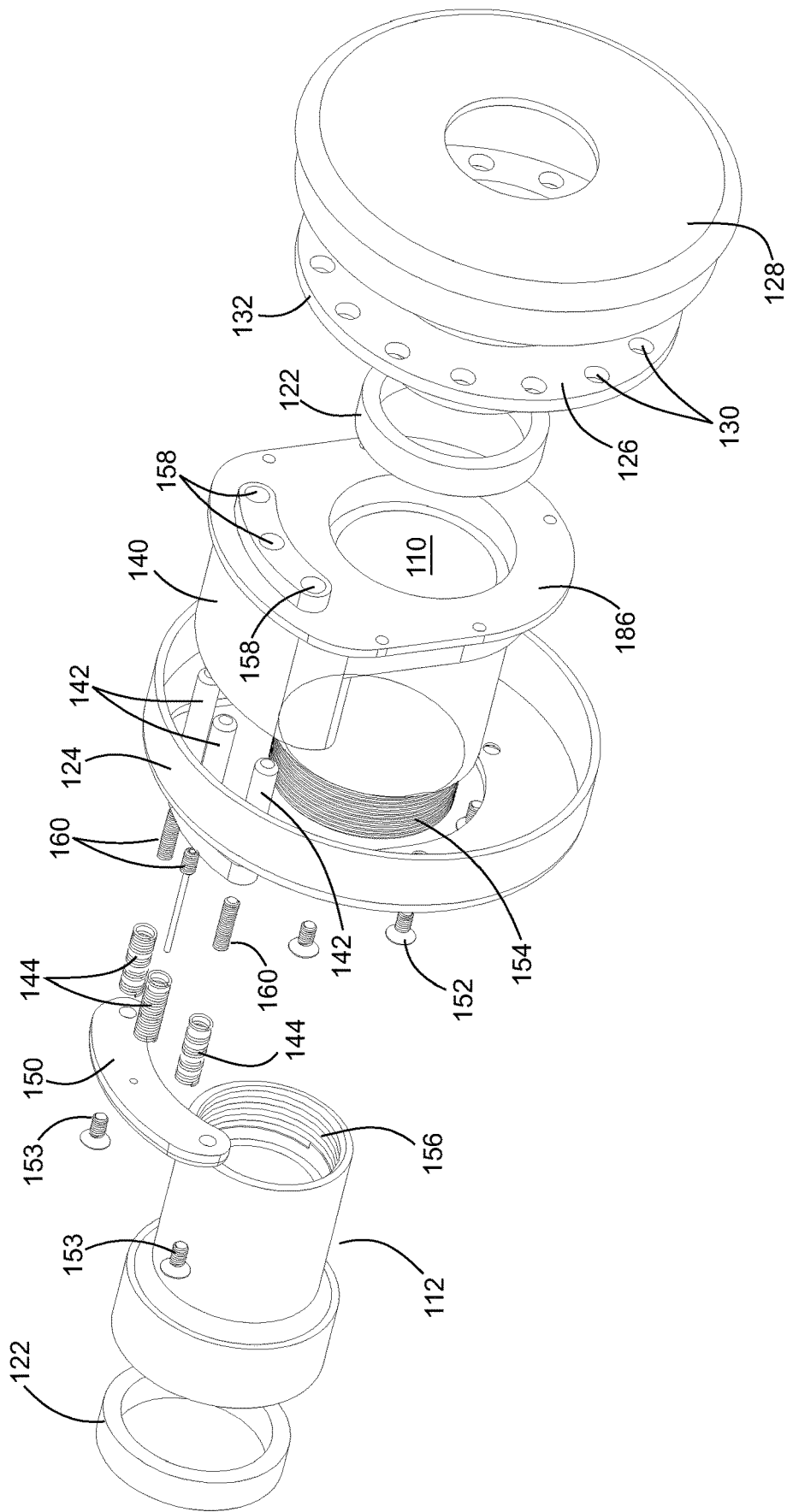
FIG. 9 is another exploded view of the bottom bracket of FIG. 8.

Referring to FIGS. 8 and 9, which show exploded views of an embodiment of the bottom bracket 100, one or more bearing cages 122 containing ball bearings (not shown) may be located within the housing cavity 110 and/or the adapter cavity 120 in order to facilitate the rotation of the spindle 10 within the bottom bracket 100. For example, one of the bearing cages 122 may be located proximate to the adapter first end 114 and another one of the bearing cages 122 may be located proximate to the housing second end 106. The adapter 112 may comprise an adapter enlarged end 182 proximate to the adapter first end 114. The inner diameter of the adapter cavity 120 at the adapter enlarged end 182 may be greater than the inner diameter of the adapter cavity 120 elsewhere along the adapter tubular portion 118 in order to accommodate one of the bearing cages 122 within the adapter enlarged end 182. It will be understood that the number and location of the bearing cages 122 may be changed.

As shown in FIGS. 8 and 9, the housing 102 further comprises a compartment 124 extending around at least a portion of the housing tubular portion 108 and configured to hold a substantially circular disc 126. Preferably, the compartment 124 is generally cylindrical in order to accommodate the disc 126. The compartment 124 may be located proximate to the housing second end 106. A cover 128 may engage with the compartment 124 in order to generally enclose the disc 126 within the compartment 124 and the cover 128. The cover 128 is also preferably generally cylindrical in order to securely engage with the compartment 124.

The disc 126 comprises a plurality of disc openings 130 extending through the disc 126 that are preferably evenly distributed proximate to a circumferential edge 132 of the disc 126. In other words, the angularity between adjacent disc openings 130 is preferably substantially the same. In the embodiment shown in FIGS. 8 and 9, the disc 126 comprises fifteen disc openings 130 (such that the disc openings 130 are arranged approximately 24° from each other); however, it is understood that other numbers of disc openings 130 are also possible.

The disc 126 also comprises a central opening 134 that is adapted to engage with the spindle 10. In the embodiment shown in FIGS. 8 and 9, the central opening 134 is generally defined by a plurality of indents 136 that facilitate the engagement of the spindle 10 with the central opening 134. Referring to FIG. 5, which shows the bottom bracket 100 engaged with the spindle 10, the spindle 10 may comprise teeth 18 that extend inwardly from the ends of the spindle 10 for at least a portion of the length of the spindle 10. The indents 136 are adapted to engage with the teeth 18 such that any rotation of the spindle 10 will also cause corresponding rotation of the disc 126 within the compartment 124. However, other means of engagement between the spindle 10 and the disc 126 are also possible.

The housing 102 may comprise a housing flanged end 184 proximate to the housing second end 106. The inner dimeter of the housing cavity 110 at the housing enlarged end 184 may be greater than the inner diameter of the housing cavity 110 elsewhere along the housing tubular portion 108 in order to accommodate one of the bearing cages 122 within the housing enlarged end 184. The housing 102 may further comprise a flange 186 at the housing second end 106.

The housing 102 further comprises a lock assembly 138 that may extend away from the compartment 124 towards the housing first end 104. The lock assembly 138 comprises a lock assembly housing 140 for enclosing, at least in part, one or more pins 142. The lock assembly housing 140 comprises pin openings 158 that correspond to the pins 142 and allow for the pins 142 to pass therethrough. The pins 142 are adapted to movably engage with and pass through the disc openings 130. The engagement of the pins 142 through the disc openings 130 will result in the locking of the disc 126 and prevent any further rotation of the disc 126 within the compartment 124. This locking of the disc 126 will, in turn, result in the locking of the spindle 10, thus preventing any further rotation of the spindle 10 or the crankset 12.

In the embodiment shown in FIGS. 8 and 9, there are three pins 142 that are configured to engage with three adjacent disc openings 130. There are also three corresponding pin openings 158 formed on the lock assembly housing 140 that allow for the pins 142 to pass therethrough. However, it is understood that a different number and arrangement of pins 142 and pin openings 158 are also possible.

Where there is a plurality of the pins 142 present (e.g. as in the embodiment shown in FIGS. 8 and 9), the pins 142 may be connected together through a pin bar 148. For example, in the embodiment shown in FIGS. 8 and 9, the pins 142 are fixedly connected at one of their ends to the pin bar 148, thereby ensuring that the pins 142 are held in the correct angular orientation with respect to each other in order to engage with the disc openings 130.

Referring to FIGS. 8 and 9, the engagement of the pins 142 through the disc openings 130 may be effected using one or more springs 144. The springs 144 may be connected to the pins 142 or the pin bar 148 using spring attachment members 160. The pins 142 are able to move longitudinally within the lock assembly housing 140 (and through the pin openings 158) in a direction generally perpendicularly to the disc 126. When the pins 142 are in the "unlocked" state, the pins 142 are located substantially completely within the lock assembly housing 140 and clear of the disc 126. Therefore, the disc 126 is freely able to rotate within the compartment 124. The pins 142 are attached to the springs 144, which are normally under compression when the pins 142 are in the "unlocked" state. In this state, the pins 142 are held in place away from the disc 126, substantially within the lock assembly housing 140.

A cable 146 extends from the lock assembly housing 140 and is used to control the operation of the pins 142. The cable 146 may extend to the handlebars (not shown) to allow for easy control of the operation by the rider (e.g. similar to control of derailleur gears).

When the rider wishes to actuate the locking of the disc 126 (and thus the locking of the crankset 12), the rider may do so through the cable 146. For example, in one embodiment, the cable 146 may normally be under tension, thereby causing the springs 144 to be compressed (in the "unlocked" state). Actuation may be carried out by, for example, releasing the tension on the cable 146. When the tension in the cable 146 is released, the pins 142 are moved to the "locked" state by releasing the springs 144 and allowing them to decompress. This decompression of the springs 144 forces the pins 142 to start to move out from the lock assembly housing 140 and into the compartment 124. This longitudinal movement of the pins 142 will cause the pins 142 to impact upon the surface of the disc 126. As the disc 126 may be rotating, the pins 142 will eventually catch upon the disc openings 130, causing the pins 142 to pass into the disc openings 130 and through the disc 126.

The passing of the pins 142 through the disc 126 effectively prevents the disc 126 from any further rotation, thereby "locking" the disc 126. For example, the shape of the lock assembly housing 140 may prevent any lateral or rotational movement of the pins 142. The lock assembly 138 may comprise a lock assembly cover 150 to enclose, at least in part, the pins 142 and the springs 144.

When the cable 146 is placed back under tension, the pins 142 are moved longitudinally back into the lock assembly housing 140 (thereby compressing the springs 144) and out of the disc openings 130. When the pins 142 are no longer engaging the disc 126, the disc 126 is "unlocked" and again free to rotate within the compartment 124.

It is understood that other ways of actuating the locking and release of the disc 126 are also possible. For example, circuitry and/or motors may be added to allow for electronic actuation of the pins 142. Furthermore, radio transmitters and receivers may also be added to allow for wireless actuation of the pins 142.

Therefore, by selectively moving the pins 142 into and out of the disc 126, the rotation of the disc 126 (and therefore the crankset 12) may be locked and unlocked, respectively, by the rider. As explained above, it is sometimes desirable for the rider to lock the crankset 12 so as to prevent further rotation of the pedals. This may be the case, for example, if the rider is executing a jump and the rider does not wish to have the pedals to be able to rotate while the bicycle is in mid-air.

Referring to FIGS. 8 and 9, the bottom bracket 100 may comprise a plurality of fasteners for attaching the various components thereof together. For example, lock assembly fasteners 152 may be used to secure the compartment 124 to the flange 186, and cover fasteners 153 may be used to secure the lock assembly cover 150 to the lock assembly housing 140. In addition, the bottom bracket 100 may comprise a fitting ring 180 located between the disc 126 and one of the bearing cages 122.

Figure 10:
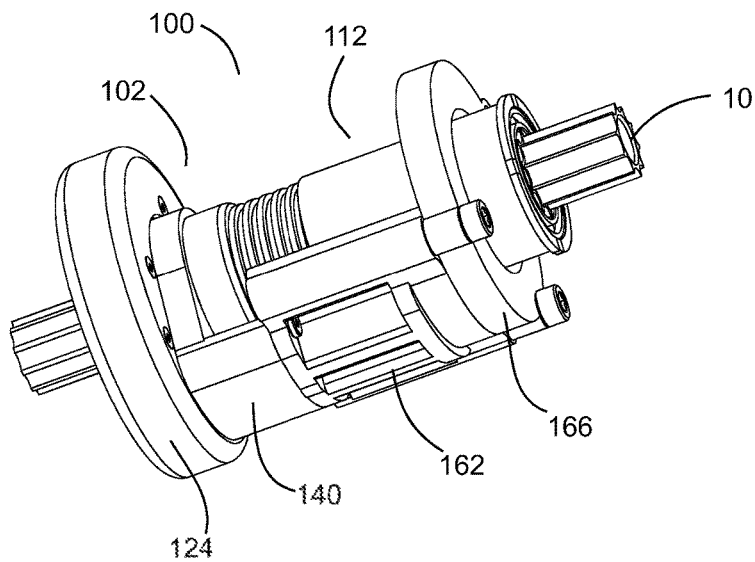
FIG. 10 is a perspective view a bottom bracket in accordance with another embodiment.
Figure 11:
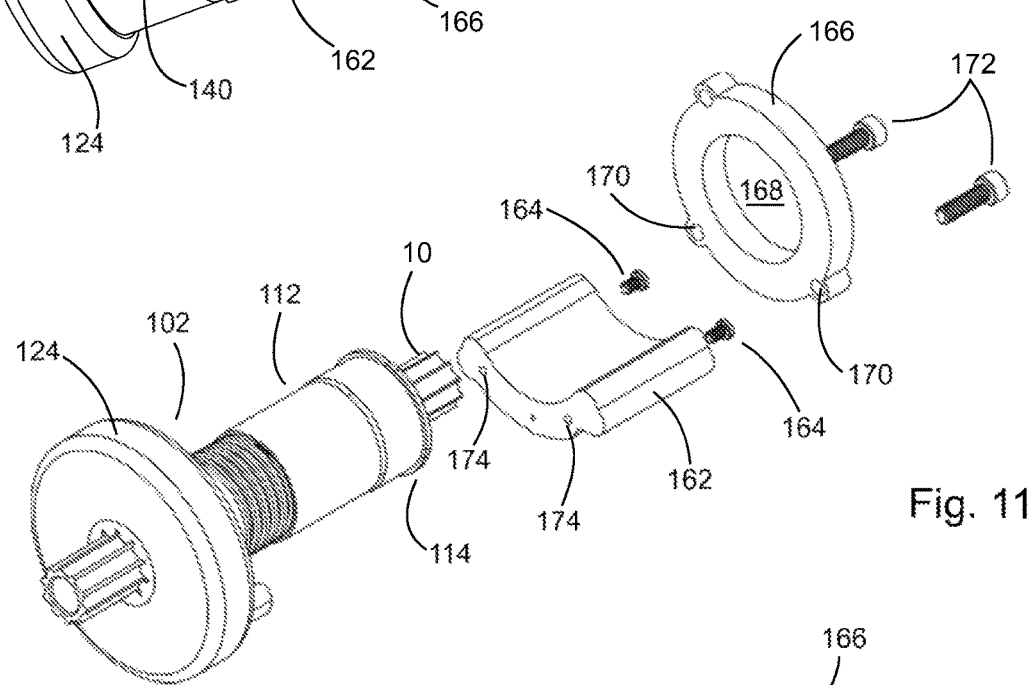
FIG. 11 is an exploded view of the bottom bracket of FIG. 10.
Figure 12:
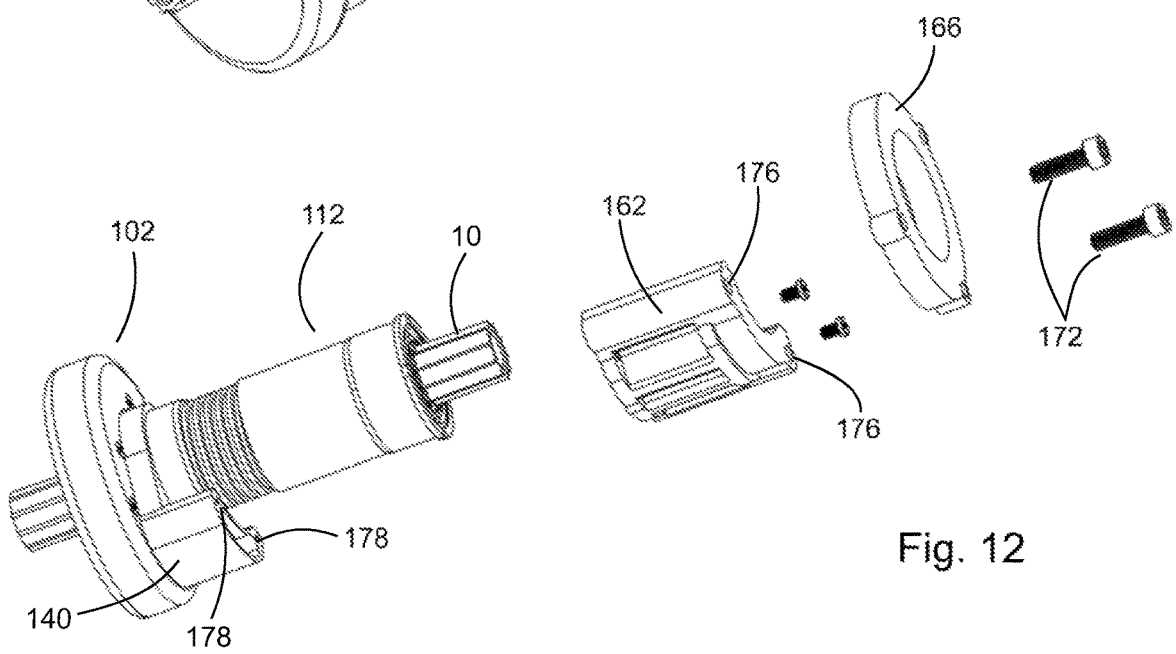
FIG. 12 is another exploded view of the bottom bracket of FIG. 10.

Referring to FIGS. 10 to 12, in another embodiment of the invention, the bottom bracket 100 further comprises a rotation coupler 162 adapted to engage with the lock assembly housing 140. The rotation coupler 162 may be secured onto the lock assembly housing 140 using coupler fasteners 164.

For example, the coupler fasteners 164 may engage with first coupler openings 174 on the rotation coupler 162 and with lock assembly openings 178 on the lock assembly housing 140 to secure the rotation coupler 162 with the lock assembly housing 140. In this embodiment, the lock assembly cover 150 would not be necessary, as the rotation coupler 162 may be connected directly to the lock assembly housing 140.

The bottom bracket 100 may further comprise a bracket 166 that may be removably attached to the rotation coupler 162. The bracket 166 is generally circular, with a bracket opening 168 that allows the bracket 166 to slide around and over the adapter first end 114. The bracket 166 preferably comprises one or more bracket fastener openings 170 that are adapted to receive bracket fasteners 172. The bracket fastener openings 170 are aligned with corresponding second coupler openings 176 on the rotation coupler 162 such that the bracket fasteners 172 are able to secure the bracket 166 onto the rotation coupler 162. The bracket 166 may take the form of a ISCG-05 chain guide bracket.

The bracket 166 may then be securely held in place on the frame 14 of the bicycle (e.g. as with conventional chain guide brackets). By holding the bracket 166 (and thereby the rotation coupler 162) in place, this prevents the lock assembly housing 140 from inadvertently rotating (with respect to the bottom bracket shell 16), especially when extreme force is exerted on the crankset 12.

Figure 13:
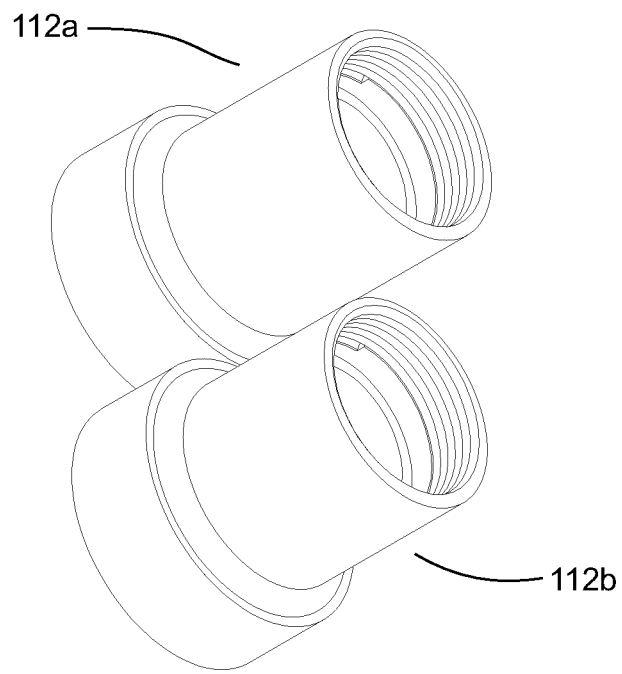
FIG. 13 is a perspective view showing two adapters of different lengths.
Figure 14:
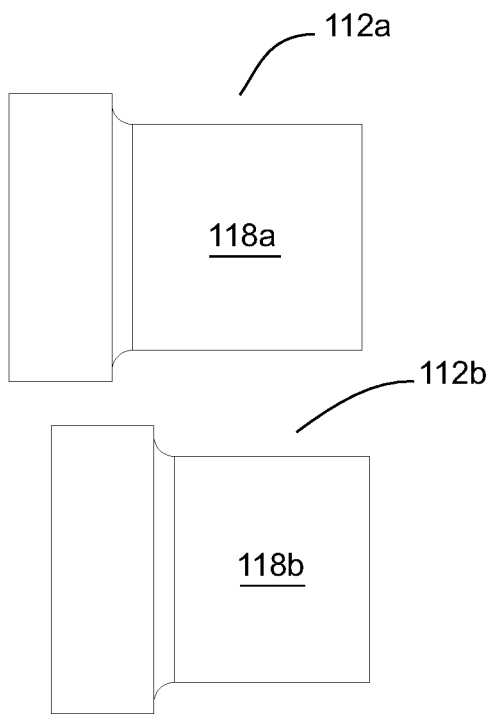
FIG. 14 is a side view showing the two adapters of FIG. 13.

Different bicycle manufacturers and different bicycle models may employ spindles 10 of different lengths. In order to accommodate such differences in the lengths, the bottom bracket 100 may use adapters 112 that are of differing lengths. For example, referring to FIGS. 13 and 14, two adapters 112a, 112b are shown. The adapters 112a, 112b are different in length such that the adapter tubular portion 118a of the adapter 112a is longer than the adapter tubular portion 118b of the adapter 112b. When the adapters 112a, 112b are attached to the housing 102, the resulting bottom bracket 100 will have different lengths. For example, if the spindle 10 for a particular bicycle is relatively long, the adapter 112b may be used. By utilizing adapters 112 of different lengths, this allows the housing 102 to be relatively uniform, while the length of the adapter 112 can be varied to accommodate particular makes and models of bicycles.

Figure 15:
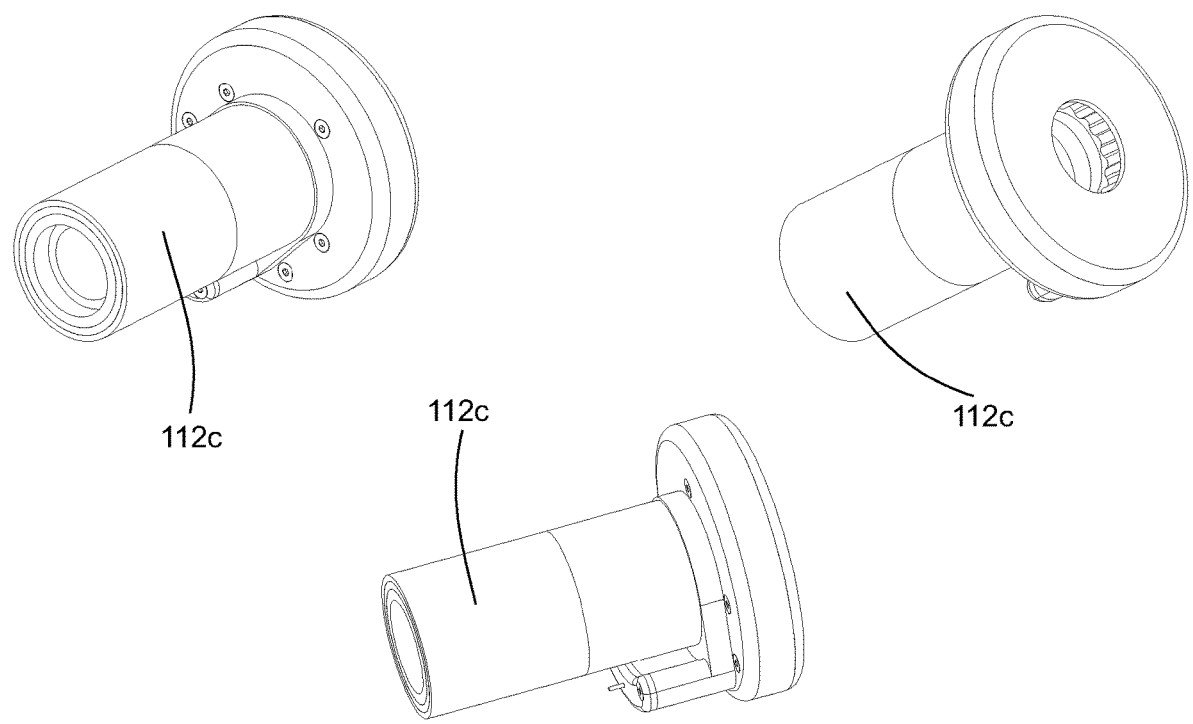
FIG. 15 shows various perspective views of another adapter for accommodating a different bore diameter.

In addition to length, the bore diameter may also vary from different makes and models. Referring to FIG. 15, additional adapter 112c is shown to accommodate a different bore diameter than those shown in the other figures.

In addition to conventional human-propelled bicycles, the bottom bracket 100 may also be used with electric bicycles. The bottom bracket 100 of this invention may also be used by disabled cyclists (e.g. cyclists with one leg). By providing a mechanism to lock the and unlock the crankset 12, the cyclist is able to temporarily rest his or her leg.

It will be appreciated by those skilled in the art that the preferred embodiment has been described in some detail but that certain modifications may be practiced without departing from the principles of the invention.

The invention claimed is:

1. A bottom bracket connected to a spindle and a frame of a bicycle, the bottom bracket comprising:
a housing connected to the frame, the housing comprising:
a substantially circular disc, the disc comprising:
a plurality of disc openings arranged proximate to a circumferential edge of the disc, wherein the disc is adapted to rotate with the spindle; and
a central opening adapted to engage with the spindle, wherein the central opening is defined by a plurality of indents for engaging with the spindle:
one or more pins adapted to selectively engage with the disc openings, wherein the engagement of the one or more pins with the disc openings prevents further rotation of the disc and the spindle; and
an actuating mechanism for selectively engaging the one or more pins with the disc openings; and
an adapter removably attached to the housing and connected to the frame.

2. The bottom bracket of claim 1, wherein the actuating mechanism comprises one or more springs attached to the one or more pins.

3. The bottom bracket of claim 2, wherein the actuating mechanism further comprises a cable connected to the one or more springs.

4. The bottom bracket of claim 3, wherein the cable effects either a compression or a decompression of the one or more springs, wherein a compression of the one or more springs effects a disengagement of the one or more pins with the disc openings, and wherein a decompression of the one or more springs effects an engagement of the one or more pins with the disc openings.

5. The bottom bracket of claim 1, wherein the adapter is removably attached to the housing through threaded engagement between the adapter and the housing.

6. The bottom bracket of claim 1, wherein the housing comprises a housing cavity extending through the housing, wherein the adapter comprises an adapter cavity extending through the adapter, wherein the housing cavity and the adapter cavity are substantially coaxial, and wherein the housing cavity and the adapter cavity are adapted to allow the spindle to extend therethrough.

7. The bottom bracket of claim 6 further comprising one or more bearing cages located within one or both of the housing cavity and the adapter cavity to allow for rotation of the spindle within the housing cavity and the adapter cavity.

8. The bottom bracket of claim 7, wherein the one or more bearing cages comprise two bearing cages and wherein the two bearing cages are located proximate to opposing ends of the bottom bracket.

9. The bottom bracket of claim 1, wherein the plurality of disc openings is fifteen disc openings.

10. The bottom bracket of claim 1, wherein the one or more pins is three pins.

11. The bottom bracket of claim 1, wherein the housing and the adapter are rigidly attached to the frame.

12. A bottom bracket connected to a spindle and a frame of a bicycle, the bottom bracket comprising:
a housing connected to the frame, the housing comprising:
a substantially circular disc, the disc comprising a plurality of disc openings arranged proximate to a circumferential edge of the disc, wherein the disc is adapted to rotate with the spindle;
one or more pins adapted to selectively engage with the disc openings, wherein the engagement of the one or more pins with the disc openings prevents further rotation of the disc and the spindle;
an actuating mechanism for selectively engaging the one or more pins with the disc openings;
a compartment, wherein the disc is located within the compartment; and
a lock assembly, wherein the selective engagement of the one or more pins with the disc openings is through movement of the one or more pins within the compartment and the lock assembly;
a rotation coupler attached to the lock assembly;
a bracket attached to the rotation coupler and to the frame; and
an adapter removably attached to the housing and connected to the frame.

13. The bottom bracket of claim 12, wherein the bracket comprises a bracket opening for the spindle to pass therethrough.

14. The bottom bracket of claim 12, wherein the bracket is a chain guide bracket.

15. A bottom bracket connected to a spindle and a frame of a bicycle, the bottom bracket comprising:
a housing connected to the frame, the housing comprising:
  a substantially circular disc, the disc comprising a plurality of disc openings arranged proximate to a circumferential edge of the disc, wherein the disc is adapted to rotate with the spindle;
  a plurality of pins adapted to selectively engage with the disc openings, wherein the engagement of the pins with the disc openings prevents further rotation of the disc and the spindle;
  a pin bar for connecting together the pins; and
  an actuating mechanism for selectively engaging the pins with the disc openings through the pin bar; and
an adapter removably attached to the housing and connected to the frame.

* * * * *